United States Patent [19]

Issenmann

[11] Patent Number: 4,565,007
[45] Date of Patent: Jan. 21, 1986

[54] PROCESS AND APPARATUS FOR MEASURING THE COILED/UNCOILED LENGTH OF WINDING GEAR CABLE

[75] Inventor: Olivier Issenmann, Lamorlaye, France

[73] Assignee: Geoservices S. A., Le Blanc Mesnil, France

[21] Appl. No.: 535,756

[22] Filed: Sep. 26, 1983

[30] Foreign Application Priority Data

Sep. 27, 1982 [FR] France ............................ 82 16187

[51] Int. Cl.$^4$ ............................................. G01B 5/04
[52] U.S. Cl. ....................................... 33/127; 33/126.5
[58] Field of Search ................... 33/127, 126.5, 126.6, 33/133, 172 F

[56] References Cited

U.S. PATENT DOCUMENTS

| | | | |
|---|---|---|---|
| 2,134,025 | 10/1938 | Bredoun | 33/126.6 |
| 2,624,119 | 1/1953 | Magnuson | 33/126.5 |
| 2,934,695 | 4/1960 | Maulisby | 33/127 |
| 3,205,607 | 3/1962 | Pattantyus | 33/127 |
| 3,217,291 | 11/1965 | King | 33/126.5 |
| 4,200,982 | 5/1980 | Mueller et al | 33/126.6 |

FOREIGN PATENT DOCUMENTS 594751 8/1959 Italy ................................. 33/126.6
1257678 12/1971 United Kingdom .

Primary Examiner—Willis Little
Attorney, Agent, or Firm—Wenderoth, Lind & Ponack

[57] ABSTRACT

An apparatus and process for measuring the uncoiled length or coiled length of a cable of a winding gear such as a winch marks the cable along a generatrix of winding passing from one point of one turn of a layer of turns of the cable wound on a drum or on a subsequent layer carrying the cable for each would layer and on the total length of the cable corresponding to this layer at least one pair of equi-distant bench marks. A comparison is then made between the overall length, reeled off for each layer, and corresponding to the algebraic sum of the series of equal sections between them for each layer, to that calculated for a standard layer traversed by the cable. A processor receives successive periodic signals emitted by a measuring sensor which furnishes with each turn of the winch, as a function of the diameter of the turns and their number in each successive layer, a series of measurement signals which, once processed, furnish to a display device, the true length of a cable that has been reeled off or reeled on the drum.

9 Claims, 11 Drawing Figures

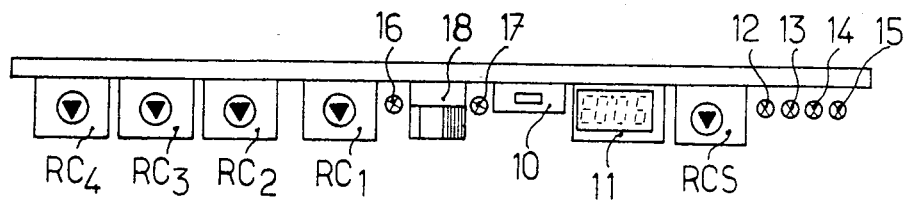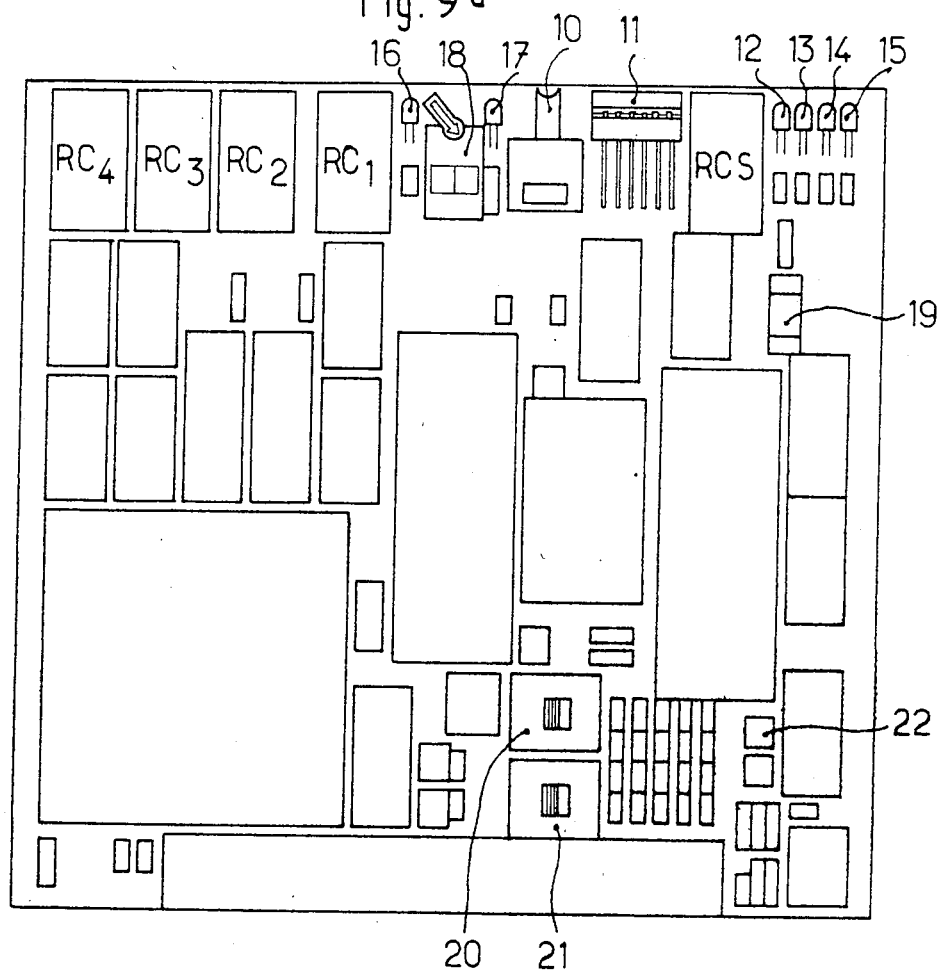

PROCESS AND APPARATUS FOR MEASURING THE COILED/UNCOILED LENGTH OF WINDING GEAR CABLE

BACKGROUND OF THE INVENTION

The present invention relates to an apparatus and process for measuring the uncoiled length or coiled lenth of a cable of a winding gear such as a winch.

A problem arises in various fields of knowing exactly the coiled or uncoiled length of a cable with a view to determining with precision the position of its free end to which can be coupled a movable element, for example, a crane hook, a lift cage or a telpher railway cage, or further to measure the depth of a well or that of the extension of a string of rods or a fitment into a borehole.

Likewise, sooner than weighing, it is of interest to measure the coiled length of a cable or the like on a spool.

In another aspect, on a construction side, for example, it is of interest to a crane driver, with the jib overhanging an excavation the bottom of which he cannot see, but the depth of which can be indicated to him, so as to know the level at which the load he is manipulating is at.

In another connection, for cages or buckets of telpher railways, it is of interest at the command post to know exactly the position of a cage or bucket; this may be necessary in rescue cases for shifting an auxiliary relief chair or, in transporting concrete by providing a flow thereof to bridge piers or dams, for positioning of the charge so to avoid trial and error which can often be dangerous to personnel.

Finally, in the petroleum industry they use what are called "measuring captors" which serve to measure the advancement of a rod or a string of rods, devices which capitalize on the rotation of the winch main shaft, each turn on the winding drum of the winch being in fact counted as a mean circumference of the winding drum of the winch (mean length of a turn of cable).

Existing means for measuring the wound/unwound length of a cable is imprecise, because the length of each turn of cable which is wound tangentially in two subjacent turns is not the same in one layer of turns as another, the length of a turn in fact varies each time that a complete layer is rolled on or unrolled from the winding drum.

The present invention has for object to palliate the inconveniences of known means and it has for essential object a process and a means permitting, by algebraic summation of the real lengths of successive turns reeled off or reeled on by a winding gear to indicate exactly the length of cable unrolled from or rolled up on the winding drum of the winding gear, that is to say, in fact to specify the position of a load fixed to the free end of the cable.

SUMMARY OF THE INVENTION

According to the invention, the process consists in marking the cable along a generatrix of winding passing from the anchorage point of the first turn of a layer of turns wound together onto the winding drum or onto a subjacent layer, in carrying on the said cable, for each layer wound and on the total length of the cable corresponding to each layer, a series of equidistant benchmarks and in comparing the overall length, for each layer reeled off (the algebraic sum of the series of equal sections between them for each layer) with that calculated, for a standardized length traversed by the cable, by a processing circuit which receives successive periodic signals emitted from a measuring sensor and supplying at each turn of the winch, as a function of the diameter of the turns and of their number in each successive layer, a series of measurement signals which, when processed supply to a display, the true length of cable which has been reeled off or reeled on.

According to another aspect of the present invention, the process consists, after uncoiling or coiling of a complete layer of turns, in furnishing to a calculation unit an indication which permits the use of a correction coefficient for summing the turns unrolled, providing the new individual length of turn to be taken into account for a fresh layer of turns in the course of reeling off or reeling on.

In the case of applying the process to a sensor of the depth of a borehole, the invention envisages that the standardization of the cable is done between two fixed settings in a no load condition.

In one particular way of putting the process into practice, applicable to measuring the depth to which a train of rods penetrates a bore hole, the lengths of the said train of rods (known effectively) serves to standardize the length of cable "measured" which the processing circuit determines by summing the intervals (lengths of successive turns) defined by the signal furnished by the sensor associated with the shaft of the winch.

As has been indicated, the invention equally has for object the production of apparatus serving to put the above described process into practice.

According to the invention, this apparatus comprises in combination a measuring sensor furnishing at each turn of shaft or drum of the winding gear, in one sense of rotation or the other, a series of periodic signals supplying, with each following or preceding signal, an algebraic value corresponding to a fixed length of cable reeled off or reeled on by the gear, an electronic processing circuit designed to receive signals emitted by the said sensor, and processing them so as to calculate the length of cable effectively reeled off the drum or rewound onto the latter between the first and last signal received and to display the said value after having previously modified it if necessary, as a function of the value furnished by a second incremental-type displacement sensor used when the winding gear is subjected to variations in level during its operation.

Such a variation in level is observed, for example, when the measuring device in accordance with the invention is used on a marine borehole platform; in the case where the rotation table causes a relative displacement in relation to the pull of the cable, such a displacement would falsify the measurement if it were not taken into account.

Moreover, one of the objects of the invention is the realization of a measurement sensor for the advancement of rods or the like for boreholes, which are able to be mounted onto the main shaft of the winch winding gear, or on the side of a high speed coupling, or on the side of a slow speed coupling such as to furnish precise indications allowing easy and practically instantaneous determination of the displacement of the pull and equally, the number of rods (of fixed length about nine meters each) which have been put into place in the borehole.

The sensor is, moreover, conceived to furnish, in combination with a processing unit, a record of the signals supplied and from this record an indication of the overall traverse of the hook of the winding gear, that is to say, the length of penetration or raising of a rod or several rods.

The sensor, which functions in both senses of rotation, ought to permit the noting, as a function lapsed time, of the descent and ascent movement of the train and the intermediate stops for adding or removing rods.

The sensor of preferment according to the invention is also arranged for furnishing a precise measurement for sea boreholes, in the case where the height of the rotating table varies with the swells of the sea. In that case, a complementary sensor can furnish indications on the true position of the table each time.

In one preferred embodiment of the device, the part providing the signals to the processing circuit is constituted by a rotation sensor mounted on the axis of the winding gear and carrying a pickup component furnishing signals to a recording and interpreting unit, the signals corresponding to each unit length of cable unwound by the winch or wound up by it.

BRIEF DESCRIPTION OF THE DRAWINGS

The invention will now be described with reference to the accompanying drawings which represent schematically, and simply by way of example, an embodiment of the invention and in which:

FIGS. 9a and 9b are schematic views respectively in plan and end view of an electronic processing circuit for recording, interpreting and using the signals furnished by the sensors.

FIG. 11 is a simplified flow chart of the operation of a portion of the present invention.

DESCRIPTION OF THE PREFERRED EMBODIMENTS

Thus, as has been indicated, the problem posed, which is the basis of the invention, consists in calculating the length of the turns for each wound layer and signalling to a treatment unit the change in layer while taking account, during the calculation operation, the variation in length from one layer to another being given the dimensions of the winding-drum carried by the winch.

It is therefore necessary at the start of the calculation system to be able to specify, at any instant, on which turn one is in order to be able to effect the measurement in a certain fashion.

In another aspect, the system in accordance with the invention is conceived to be able to work on land, in which case the distance to the ground from a rotation table is in practice constant, or at sea on floating platforms, in which case it is necessary to take into account variations in the level of the rotation table resulting from swells.

In the case of floating rigs, and according to another characteristic of the invention, the use of two supplementary sensors is provided for, that is, a suspended motion compensating sensor as well as a water-line movement sensor.

In order to obtain satisfactory precision, the invention equally provides for standardization if a rod or the like is held between two fixed settings, the pulley block being "free" i.e. "ON SLIP".

Figure 1:
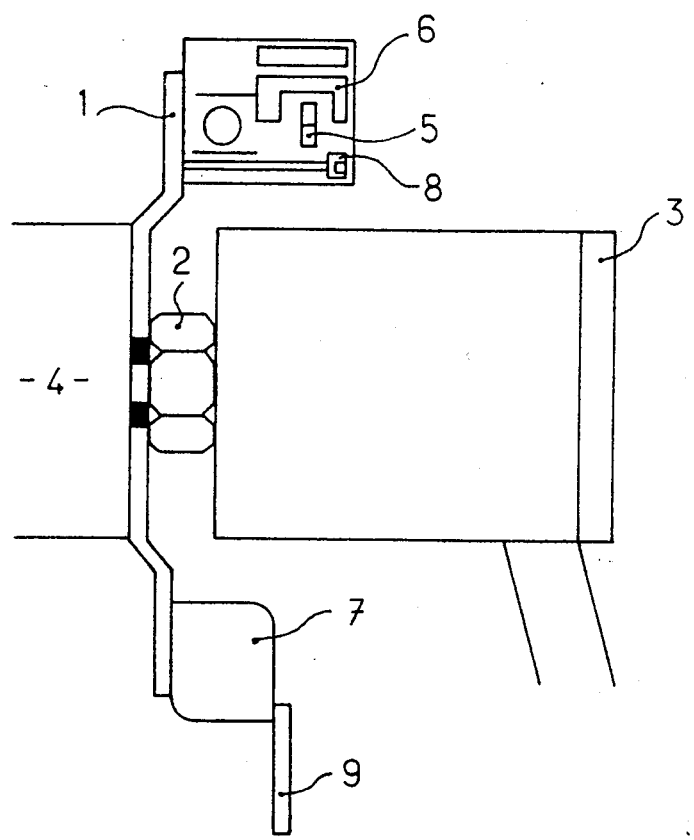
FIG. 1 is a schematic view as a whole of a sensor mounted on the end of the winch shaft.

Looking at FIG. 1, the sensor 1 is fixed by a nut 2 of a rotor-seal 3, onto the shaft 4 of a winch and it comprises a toothed wheel 5 and a forked detector 6.

The stator 7 is coupled to the rotor by screws 8, for example three in number, and blocked against rotation by the clamp 9.

Figure 3:
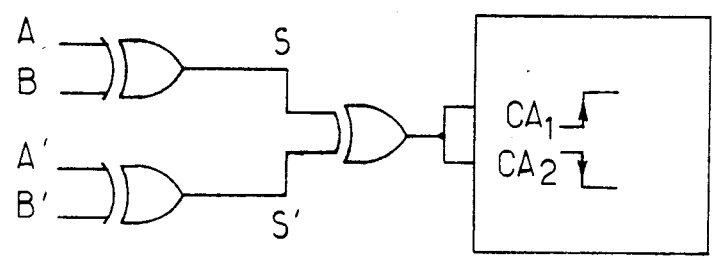
FIG. 3 is a view of an interface circuit having two trip entries $CA_1$ and $CA_2$ for the treatment of signals, S and S', provided by the winch sensor and a compensating sensor, respectively.

The sensor assembly, constituted by the toothed wheel 5 and the forked detector 6 delivers to the processing unit, represented in FIGS. 9a–9b, two rhythmic signals S and S' as square waves (FIG. 3) which, once processed, allow the position of the winding-drum of the winch to be defined with a precision of $\frac{1}{4}N$, N being the number of teeth on the wheel 5, which furnishes one impulse for each turn of the winch.

The number of impulses or events is taken to be equal to zero when the winding-drum of the winch is empty.

It can then be seen that the number of events represents the state of the winch at a given time.

Figure 8:
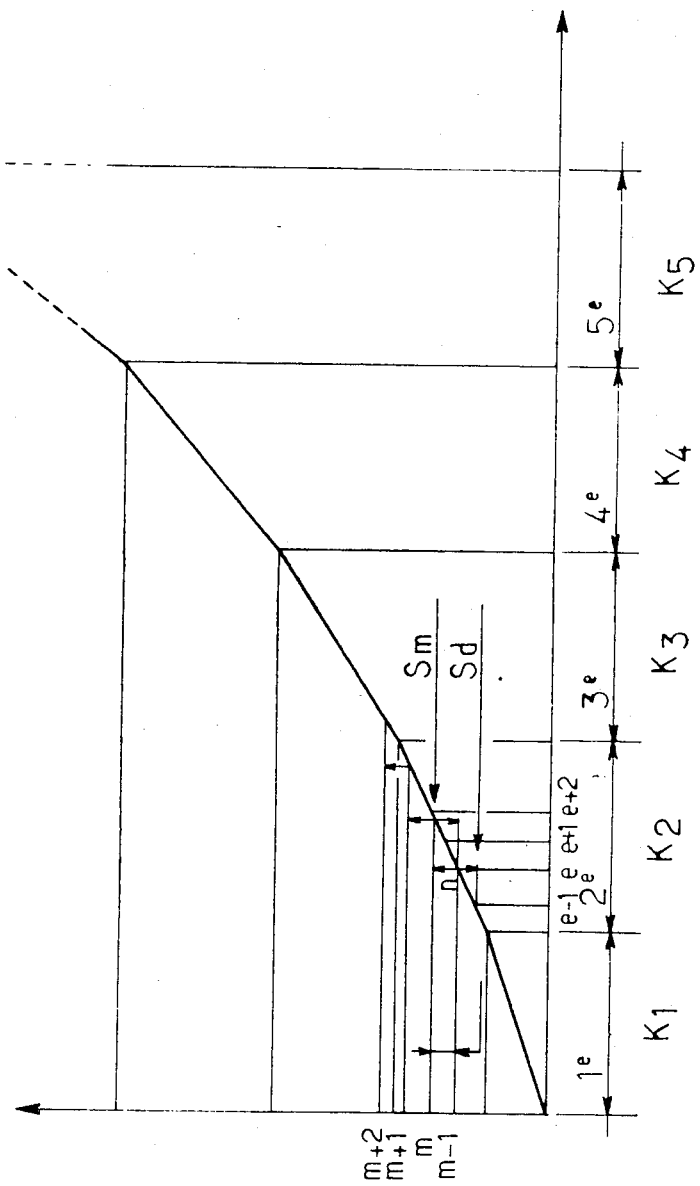
FIG. 8 is a view of a curve illustrating the displacement of a tackle-block or hook in relation to the number of events or impluses furnished by the sensor.

FIG. 8 accounts for the number of events as a function of the distance through which the pulley-block of the winch is displaced, that is to say, as a function of the ratio between the length of cable coiled up and the number of pulleys in the block.

Figure 7:
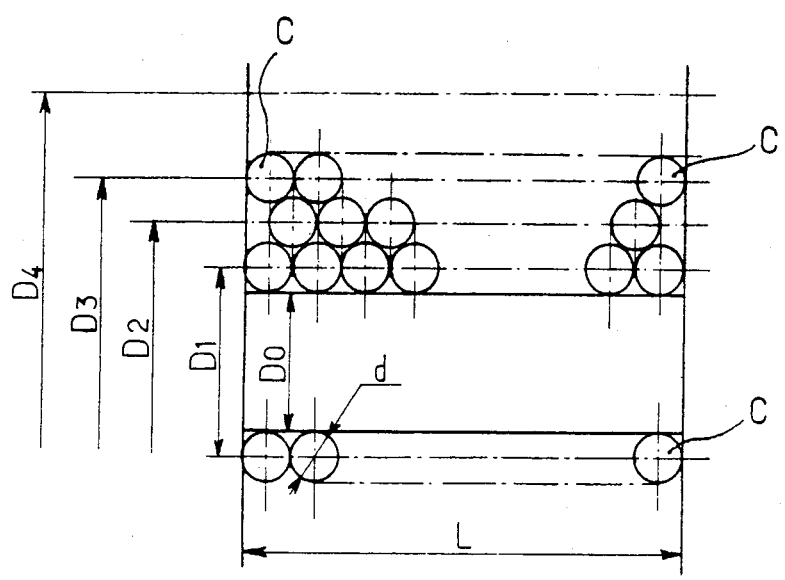
FIG. 7 is a view illustrating the diameters of the successive wound layers of cable on the winding-drum of a winch.

As illustrated in FIG. 7, there can be seen a winding with three layers of turns of cable of diameter d on a winding-drum of diameter Do and length L.

It can be seen for successive strata of the winding that:

$$D1 = Do + d$$

$$D2 = Do + d + d\sqrt{3}$$

$$D3 = Do + d + 2d\sqrt{3}$$

$$D4 = Do + d + 3d\sqrt{3}$$

$$D5 = Do + d + 4d\sqrt{3}$$

$$DN = Do + d + (n-1)d\sqrt{3}$$

The principle of the measurement method in accordance with the invention is, in its application to a derrick for boreholes, based on the same operation as the adding on or recovery of rods.

As a result, when the length of the fitment is modified, that is to say, the length of the assembly of pieces suspended from the hook, including the drill bit, the procedure is to add or remove sections (one to three rods) the length of which is known almost to the centimeter.

Then, if the displacement, d, of the hook between the exact moment of placing the fitment and that where it starts to be taken up again is calculated, the length (1) corresponding exactly with the length of section added or removed is found.

For standardizing it then suffices, in theory, to compare this length with the length of cable effectively reeled on the drum after having positioned the fitment at the bottom of the borehole.

In practice, it is a little different because the hook in fact has an elastic arrangement which offers some fifteen centimeters of play to allow for inspection of the rod without special interference. Such an arrangement could falsify the measurement.

This is why, in order to effect measurement, a system is used, conforming to the invention, which only takes into account movements when the load is of a zero value (position "ON SLIP") or more exactly below a fixed threshold value.

For measuring, the working is then variously according to Chasles' theorem for algebraic addition of oriented sections.

Figure 4:
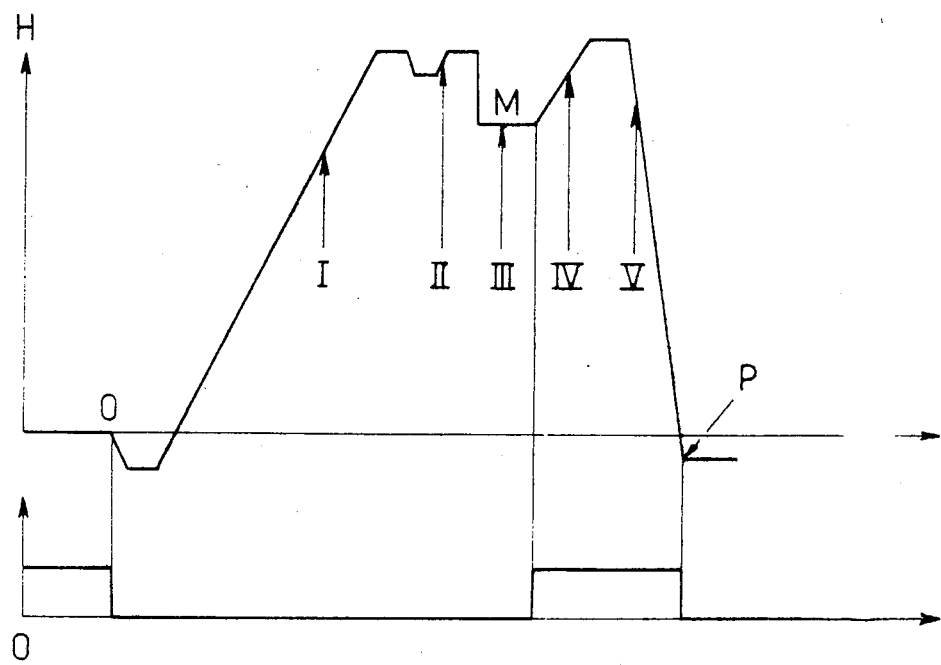
FIG. 4 is a schematic view showing the variations in length of cable intervening when a descent maneuver is implemented.

FIG. 4 represents moreover the position of the hook (height H) when the fitment is being lowered, of which the stages of ascension of the hook, empty I, hooking up (II), screwing on rods (III), releasing the block IV and descent of the fitment (V) are indicated.

It will be seen that during all those stages "ON SLIP", the algebraic measurement of the displacement from point O to point M exactly represents the length of the rods.

It is then sufficient to read off this value during the descent from M to P and to reset the counter to zero in order to have thereafter the length of the rods.

The difference between the measured length and the true length is expressed as a percentage and the coefficients K (cf. FIG. 8) initially chosen are increased or decreased appropriately.

Figure 5:
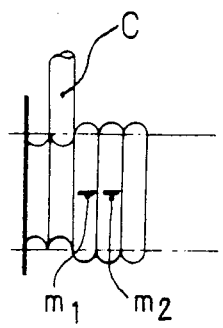
FIGS. 5 and 6 are schematic views illustrating manual verification of the calculation furnished by the treatment unit from the signals emitted by the winch.
Figure 6:
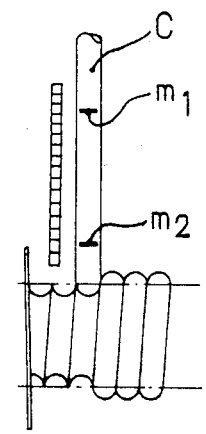

On the practical level, verification can be effected as is shown in FIGS. 5 and 6, very simply starting with the generatrix of winding of the cable marked on the latter, the interval between two marks corresponding with the length of a turn. It will be observed that a precision of one centimeter in measuring furnishes a precision of one millimeter with a block with 10 pulleys.

Although it is possible to effect a measurement of any layer, in practice, a measurement of one layer will suffice, preferably on that closest to the hub of the winch.

So far as the electronic circuit associated with the sensors and treatment of the signals which they emit is concerned, the following order of operations may be realized (see FIG. 10)
1. Process the signals coming from the rotation sensor and the compensator sensor (differential comparison), respectively designated WS and CS in FIG. 10; the signals being fed in via interface units IFW, IFC, and rotation sense discriminators RDW, RDC, to correction unit CU and then to unit ASUM effecting alegebraic summation.
2. Enter the parameters of the winch used, as indicated by box 24 to the correction unit,
3. Initiate the measurement.
4. Calculate the length of a rod or rods. (Standardization).
5. Correct by (1/1000) the coefficients of successive layers
6. Calculate the length drilled (summation).
7. Deduct and exploit the impulses from the ascent or descent of the hook.
8. Arrange for a control display in display unit 11 for the operator, of all the winch parameters.

Figure 2:
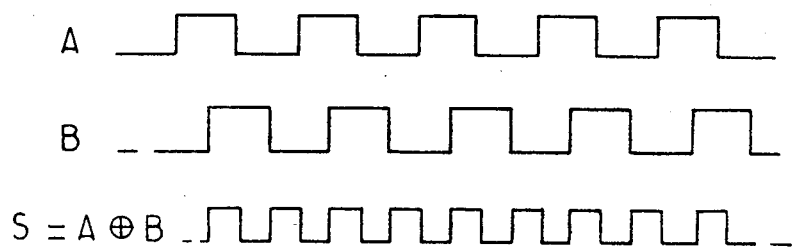
FIG. 2 is a schematic view of the signals furnished by the winch.

According to the invention, the sensor signals are treated under suspension. That amounts to saying that each change of state of one of the signals must trip a processing step. To do this a logic operator is used, say "exclusive" OR furnishing (cf. FIG. 3), for the "winch" exit, a signal S which changes state each time one of the signals A or B illustrated in FIG. 2 changes its state.

There are the following states:
$b_1 \oplus b_0 = 1$ for the winch.
$b_3 \oplus b_2 = 1$ for the compensator
$\oplus$ = logic function exclusive OR
There is the following list of states:

| A | B | A + B = S |
|---|---|---|
| 0 | 0 | 0 |
| 0 | 1 | 1 |
| 1 | 1 | 0 |
| 1 | 0 | 1 |

Figure 10:
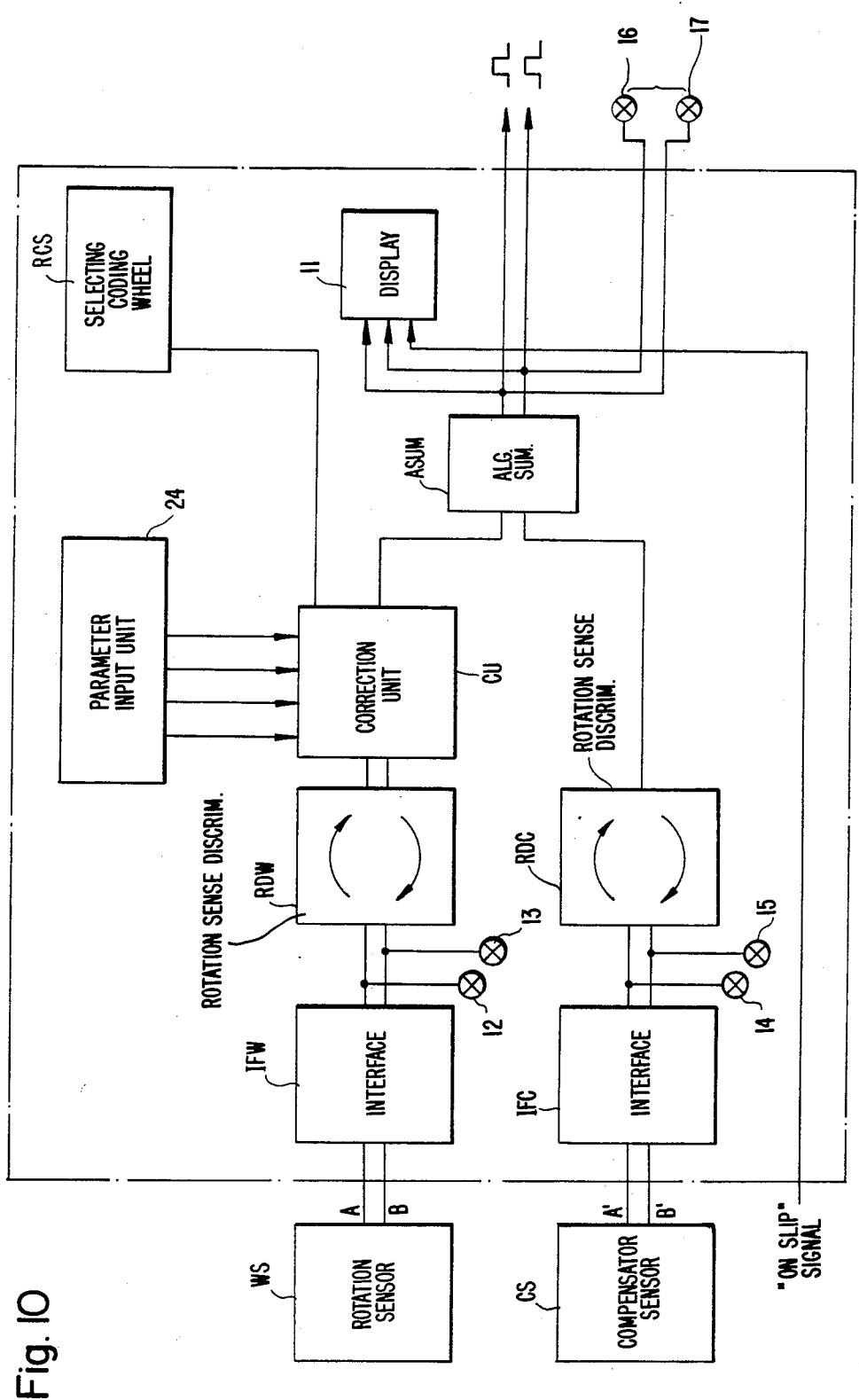
FIG. 10 is a functional schematic view illustrating the coupling of the measuring sensors with the electronic processing unit for processing of the signals which they furnish.

Then designate by:
b0 and $b_1$ the state of the "winch" signal before the stop
$b0_0^1$ and $b_1^1$ the state of the "winch" signal after the stop
$b_2$ and $b_3$ the state of the compensator signal before the stop
$b_2^1$ and $b_3^1$ the state of the compensator signal after the stop The electronic circuit presents, as illustrated in FIG. 9 an array of four coding wheels $RC_1$ to $RC_4$ corresponding to the parameter input unit 24 of FIG. 10 and allowing entry of four figure numbers, allocation of which is realized with the aid of the selecting coding wheel RC Push button, 10 assures that the memory is changed.

The display unit 11 of the circuit, permits, during functioning, verifying the word in the memory selected by the coding wheel RCS.

To initiate the circuit, it is necessary firstly to charge in order the following parameters:

Position RCS Four digit number programmed on $RC_1$-$RC_4$

| 0 | Number of events per layer. |
|---|---|
| 1 | |
| 2 | Transformation coefficients of the entry pulses |
| 3 | and exit pulses in order to have an output |
| 4 | of cm or of 1/10 of a foot for layers 1 to 5 |
| 5 | |
| 6 | Number of events from initial moment. |

The initiation takes place by placing the coding selection wheel RCS at position '6' and displaying on the four coding wheels $RC_1$ to $RC_4$ the number of increments corresponding to the winch position at a given instant.

By pressing on the push-button, 10, the angular disposition of the winch is fed to the counter at its initial value before broaching the calculation.

For the calculation, it suffices to accummulate algebraically the output impulses corresponding with the displacement of the hook.

According to whether the gear is "ON SLIP" or not, the impulses will be compatible or not.

In order to treat a centimetric output impulse, the flowchart which is illustrated in FIG. 11 must be followed.

As has already been indicated, the electronic circuit, the outline scheme of which is illustrated in FIG. 9a and 9b, and is accessible to the operator for command control of the device, apart from the four coding wheels $RC_1$, $RC_2$, $RC_3$, $RC_4$ and the coding selection wheel RCS, for practical use, also consists of control luminescent diodes (LED), 12, 13, 14 and 15 for the winch and compensator sensor signals, and control diodes 16 and 17 situated one on one side and the other on the other side of general trip, 18.

Apart from the push-button for validation (10) and the display device, 11, already mentioned above, the electronic circuit further comprises a switch 19 serving to introduce complementarily the signal "ON SLIP" state, serving in the calculation of the length drilled, by inhibiting ascending movements of the hook, which are not taken into account when this latter is displaced empty.

The coded selection wheel RCS has a plurality of positions, of which one serves to introduce to the memory, the relative error disclosed on the length measured by the calculation unit, by application "E" times on the validation push button, E being the error value disclosed. Another position allows addressing the memory zone of interest so that the microprocesser can transfer the stored value to the display 11. Finally, two inverting interruptors 20 and 21, allow the sense to be changed from "winch" to "compensator" and vice versa.

A second switch 22 allows the measurement units to be changed on the compensator and converting measurement in fact to be changed over to metric: the layer coefficients, $K_1$ to $K_n$ are in effect chosen so as to finish an impulse every tenth foot (10 pulley block).

Variations of the illustrated embodiment are possible. It is possible for example that the placing of moving parts and control could be different from that illustrated in the drawings.

I claim:

1. A process for measuring the wound/unwound length of a cable wound onto the drum of a winding gear comprising marking the cable along a generatrix of winding passing from one point of one turn of a layer of turns of the cable wound together on the drum or on a subjacent layer, carrying the cable, for each wound layer and on the total length of the cable corresponding to this layer, at least one pair of equi-distant bench marks and comparing the overall length, reeled off for each layer, and corresponding to the algebraic sum of the series of equal sections between them for each layer, to that calculated for a standard length traversed by the cable, by a processing circuit which receives successive periodic signals emitted by a measuring sensor which furnishes with each turn of the winch, as a function of the diameter of the turns and their number in each successive layer, a series of measurement signals which, once processed, furnish to a display device, the true length of cable that has been reeled off or reeled on the drum.

2. A process in accordance with claim 1, wherein, after uncoiling or coiling of a complete layer of turns, a calculating unit is provided with an indication allowing it to use a correction coefficient for summing the turns providing a new individual length of turn to be taken into account for a new layer of turns during reeling off or reeling on.

3. A process according to claim 2, wherein, when applied to a sensor of the depth of a borehole, calibration is effected between two fixed settings during a no load state.

4. A process according to claim 3, wherein the known length of the train of rods is used to calibrate the length of the cable measured, and the processing circuit operates by summation of the intervals defined by signals furnished by the sensor associated with the shaft of the winding gear.

5. An apparatus for measuring the uncoiled length of a cable wound on the drum of a winding gear comprising in combination, a measuring sensor furnishing for each turn of the drum, in one sense of rotation or the other, a series of periodic signals furnishing together with each of the following or preceding signal, an algebraic value corresponding with a fixed length of cable reeled off or reeled on by the drum, an electronic processing circuit for receiving the signals emitted by the said sensor for processing them in order to calculate the length of cable effectively reeled off the drum or reeled onto the latter between the first and the last signal received and for displaying the said value after having previously modified it, if necessary, as a function of the value furnished by a second incremental type displacement sensor used in complement when the gear is subject to variations in its level.

6. An apparatus according to claim 5, wherein said measuring sensor is constituted by a rotation sensor mounted on the drum of the winding gear and comprises a signal pick-up furnishing signals corresponding with each time that a unit length of cable is reeled off the drum or is reeled onto it.

7. An apparatus according to claim 5, wherein a compensator sensor is additionally used furnishing a correction coefficient to the processing circuit.

8. An apparatus according to claim 6, wherein the measuring sensor is mounted on the drum by a rotor-seal.

9. An apparatus according to claim 5 wherein, when it is used for measuring the depth of penetration of a string of rods of a drilling unit, the length of the said train of rods serves to calibrate the length of cable measured, the processing circuit effecting processing by summation of the intervals defined by the signals which are furnished by the measuring sensor.

* * * * *